(12) United States Patent
Tatara et al.

(10) Patent No.: US 9,022,623 B2
(45) Date of Patent: May 5, 2015

(54) VEHICULAR LAMP

(71) Applicant: Koito Manufacturing Co., Ltd., Tokyo (JP)

(72) Inventors: Naoki Tatara, Shizuoka (JP); Toru Takahashi, Shizuoka (JP); Naoki Takii, Shizuoka (JP); Yuji Sugiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 10 days.

(21) Appl. No.: 13/893,655

(22) Filed: May 14, 2013

(65) Prior Publication Data

US 2013/0312656 A1    Nov. 28, 2013

(30) Foreign Application Priority Data

May 24, 2012 (JP) .................................. 2012-118923
Feb. 4, 2013 (JP) .................................. 2013-019734

(51) Int. Cl.
 *F21V 15/04* (2006.01)
 *F16F 15/02* (2006.01)
 *B60Q 1/00* (2006.01)
 *B60Q 5/00* (2006.01)

(52) U.S. Cl.
 CPC .............. *F16F 15/02* (2013.01); *B60Q 1/0017* (2013.01); *B60Q 5/008* (2013.01)

(58) Field of Classification Search
 CPC ........................................................ F21V 15/04
 USPC .................................................. 362/390, 538
 See application file for complete search history.

(56) References Cited

U.S. PATENT DOCUMENTS

2009/0168447 A1* 7/2009 Tseng .......................... 362/524

FOREIGN PATENT DOCUMENTS

| JP | 2007283809 | 11/2007 |
| KR | 1020030039444 | 5/2003 |

OTHER PUBLICATIONS

Korean Office Action—Korean Application No. 10-2013-0054273 issued on May 23, 2014 citing JP 2007-283809 and KR 10-2003-0039444.

* cited by examiner

*Primary Examiner* — Anh Mai
*Assistant Examiner* — Meghan Dunwiddie
(74) *Attorney, Agent, or Firm* — Abelman, Frayne & Schwab

(57) ABSTRACT

A vehicular lamp is provided with a vibrator and a shock-absorbing member. The vibrator is attached to a lamp body. The lamp body vibrates in response to the vibration of the vibrator and an alarm sound is generated. The shock-absorbing member is provided to an attachment part and the transfer of the vibration from the vibrator through the attachment part is suppressed by the shock-absorbing member.

20 Claims, 14 Drawing Sheets

VEHICULAR LAMP

CROSS-REFERENCE TO RELATED APPLICATIONS

This application is based on and claims priority from Japanese Patent Application Nos. 2012-118923 and 2013-019734 filed on May 24, 2012 and Feb. 4, 2013, respectively, with the Japan Patent Office and the disclosures of which are incorporated herein in their entireties by citing here.

TECHNICAL FIELD

The present disclosure relates to a vehicular lamp, particularly to a vehicular lamp capable of emitting an alarm sound for other vehicles and pedestrians.

BACKGROUND

Recently, vehicles such as, for example, a hybrid car or an electric car that uses an electric motor as a driving source are being distributed widely. These vehicles tend to be quiet while running on the road as compared to gasoline vehicles. Particularly, the running sound of the vehicles is very quiet when driven at a low speed. Thus, there exists a problem in that other vehicles and pedestrians have difficulty in noticing these vehicles approaching from the outside of the field of vision such as, for example, from the rear side.

To solve such a problem, a technology is being developed which notifies the proximity of the vehicle by generating a pseudo engine sound separately from a motor sound. For example, Japanese Application Laid-Open No. 2007-283809 discloses a device provided with a vibrator in the inside of a headlight cover.

SUMMARY

In the device disclosed in Japanese Patent Application Laid-Open No. 2007-283809, the headlight cover vibrates and functions as a speaker provided at the exterior of a vehicle. Therefore, it has an advantage in that an alarm sound may be easily delivered around the vehicle. However, the vibration of the headlight cover may be transferred to the vehicle body through other components of a vehicular lamp and cause a noise in the interior of the vehicle.

The present disclosure has been made in consideration of such a situation and an aspect of the present disclosure is to provide a vehicular lamp capable of notifying the existence of the vehicle to other vehicles or pedestrians while suppressing the transfer of the vibration to the vehicle body.

According to an aspect of the present disclosure, there is provided a vehicular lamp that includes: a component of the vehicular lamp; a vibrator that is attached to the component and generates a sound by vibrating the component; and a vibration transfer suppression mechanism that suppresses the transfer of the vibration from the component to the vehicle body.

According to the present aspect, the sound may be generated from the component to which the vibrator is attached. In addition, the transfer of the vibration of the component to the vehicle body may be suppressed.

The vibration transfer suppression mechanism of the above-described vehicular lamp is provided at an attachment part configured to attach the vehicular lamp to the vehicle body.

The vibration transfer suppression mechanism of the above-described vehicular lamp is provided at a portion where the component of the vehicular lamp is in contact with another component.

The vibration transfer suppression mechanism of the above-described vehicular lamp is provided at the harness that electrically connects the component to the vibrator or between components.

The vibrator of the above-described vehicular lamp is attached to a first part that forms a portion of a lamp body, and the vibration transfer suppression mechanism is provided at a portion where the first part comes in contact with a second part that forms another portion of the lamp body.

The vibration transfer suppression mechanism of the vehicular lamp includes a shock-absorbing member.

The vibration transfer suppression mechanism of the vehicular lamp includes an opening.

The vibration transfer suppression mechanism of the vehicular lamp includes a portion of which the thickness is different from the surroundings.

Also, any arbitrary combinations of above-described components, and any substitutions of the components or expressions of the present disclosure among, e.g., a device, a method, and a system are also valid as an aspect of the present disclosure.

According to the present disclosure, a vehicular lamp may be provided that is capable of notifying the existence of the vehicle to other vehicles or pedestrians while suppressing the transfer of the vibration to the vehicle body.

The above-described summary is for the illustration purpose only and does not intend to limit in any ways. In addition to the illustrative embodiments, examples, and features described above, further embodiments, examples, and features will become apparent by referring to the drawings and the following detailed descriptions.

DETAILED DESCRIPTION

In the following detailed descriptions, reference is made to the accompanying drawings which form a part of the present disclosure. The illustrative embodiments described in the detailed descriptions, drawings, and claims do not intend to limit Other embodiments may be utilized and other modified examples may be made without departing from the spirit or scope of the subject matter presented in the disclosure.

Hereinafter, the same or equivalent component elements or members will be denoted by the same reference symbols in each drawing, and repeated descriptions thereof may be omitted properly. Also, dimensions of members in each drawing are illustrated in a properly enlarged or reduced scale for better understanding. Further, some members that are not important to explain an exemplary embodiment may be omitted in each drawing.

Even though a headlamp is mainly exemplified and described for a vehicular lamp described below, the vehicular lamp may be a rear combination lamp including a back lamp or a stop lamp, or other lamps.

[First Exemplary Embodiment]

An outline of a vehicular lamp according to the present exemplary embodiment is as follows.

The present vehicular lamp is provided with a vibrator. The vibrator is attached to a component of the lamp and generates an alarm sound by vibrating the component. Also, the present vehicular lamp is provided with a shock-absorbing member. The shock-absorbing member is provided to an attachment part that bonds the vehicular lamp to the vehicle body. By this shock-absorbing member, the transfer of the vibration from the vibrator to the vehicle body is suppressed.

Figure 1:
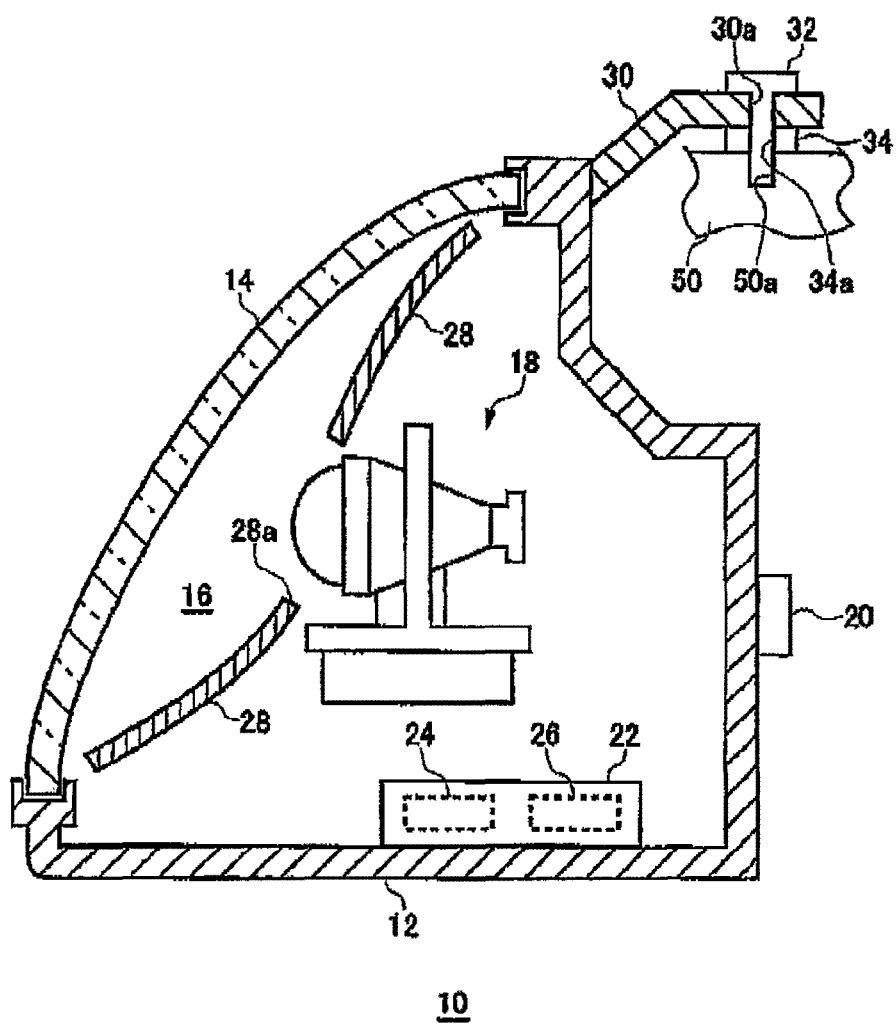
FIG. 1 is a vertical cross-sectional view illustrating a schematic configuration of a vehicular lamp according to a first exemplary embodiment.

FIG. 1 is a vertical cross-sectional view illustrating a schematic configuration of a vehicular lamp 10 according to the first exemplary embodiment. The vehicular lamp 10 includes: a lamp body 12 that has an opening at the front side of a vehicle; and an outer lens 14 that covers the opening. The outer lens 14 is made of, for example, a light transmissive resin or glass. A lamp chamber 16 is defined by the lamp body 12 and the outer lens 14. A lamp unit 18 that radiates light to the front direction of the vehicle is accommodated in the lamp chamber 16.

A lamp control unit 22 is positioned under the lamp unit 18. The lamp control unit 22 is provided with a radiation control unit 24 that executes an ON/OFF control of the lamp unit 18 and a sound generation control unit 26 that generates an alarm sound by controlling the vibrator 20. Meanwhile, the lamp control unit 22 may be provided outside of the vehicular lamp 10. Also, an extension member 28 is provided inside of the lamp chamber 16. The extension member 28 has an opening 28a in a region where the lamp unit 18 is located. The extension member 28 is fixed to the outer lens 14 but may be fixed to the lamp body 12 as well.

The vibrator 20 is fixed to the lamp body 12 and vibrates in response to an electric signal when the electric signal is input. The lamp body 12 also vibrates according to the vibration of the vibrator 20 to generate an alarm sound. The vibration of the vibrator 20 may be amplified by fixing the vibrator 20 to the lamp body 12 to, thereby generating an alarm sound that is louder than the alarm sound generated by the vibrator 20 alone. Also, since there is no need to provide an alarm sound generating device in the main body side of the vehicle, the space of the main body of the vehicle may be saved. Since the vehicular lamp is typically positioned at each of four corners of the vehicle, providing the alarm sound generating device (for example, the vibrator 20) to the vehicular lamp is suitable to generate an alarm sound extensively. Further, the vibrator 20 may be fixed to another component such as, for example, the outer lens 14 or the extension member 28. Alternatively, the vibrator 20 may be fixed to the lamp chamber 16 side of the lamp body 12.

Figure 2A:
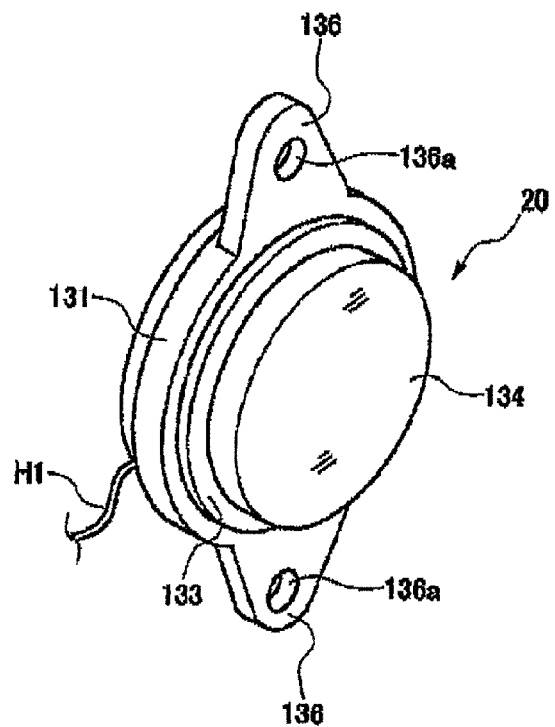
FIGS. 2A and 2B are views illustrating a configurational example of a vibrator.
Figure 2B:
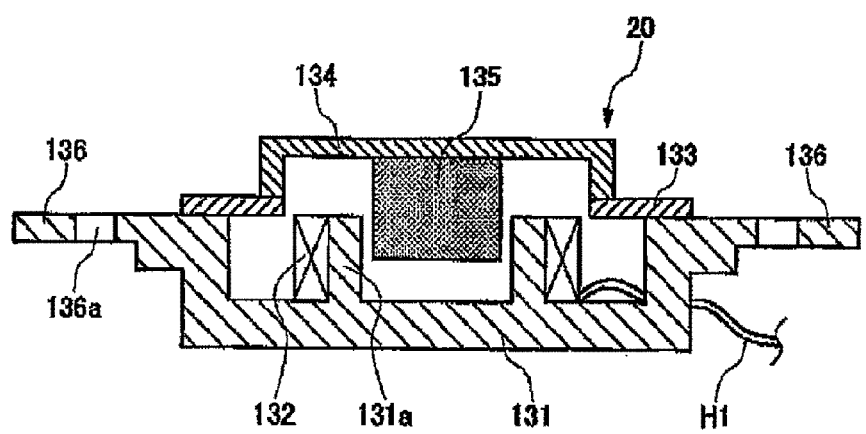

FIGS. 2A and 2B are views illustrating a configurational example of a vibrator. FIG. 2A is a perspective view of the appearance of the vibrator and FIG. 2B is a vertical cross-sectional view of the vibrator. The vibrator 20 is an electromagnetic vibration body, and a cylindrical core 131a is positioned in the inside of a cylindrical vessel-shaped body 131. The core 131a is wound around by a driving coil 132. Also, an outer peripheral edge portion of a ring-shaped spring plate 133 is attached to an opening of the body 131. A vibration plate 134 is attached to an inner peripheral edge portion of the spring plate 133. A cylindrical magnet (a permanent magnet) 135 is fixed on the inner surface of the vibration plate 134 such that the cylindrical magnet 135 is positioned to enter into the inside of the vessel of the core 131a, i.e., the inside of the driving coil 132.

At two spots of the outer edge of the body 131, tab pieces 136 are formed such that they protrude towards the outer diametral direction. Each tab piece 136 is formed with an insertion hole 136a through which a screw is inserted. A harness H1 is connected to the driving coil 132 and drawn out to the exterior of the vibrator penetrating the body 131. Through this harness H1, alternating current is applied to the driving coil 132. The magnet 135 reciprocates in the axial direction of the cylindrical part of the core 131a by an alternating magnetic field produced by the driving coil 132 and the magnetic field of the magnet 135. At this time, the vibration plate 134 bonded with the magnet 135 also reciprocates integrally, i.e., vibrates in the thickness direction of the plate while causing the spring plate 133 to bend. The vibration of the magnet 135 and the vibration plate 134 is transferred to the lamp body 12 that forms the vehicular lamp 10 to generate a sound from the lamp body 12.

Referring to FIG. 1 again, the lamp body 12 has an attachment part 30 formed to bond the vehicular lamp 10 to the vehicle body 50. The attachment part 30 is formed with a bolt insertion hole 30a. A bolt 32 is inserted through the bolt insertion hole 30a and screws into a screw hole 50a provided in the vehicle body, thereby attaching the vehicular lamp 10 to the vehicle body 50.

A shock-absorbing member 34 is provided between the attachment part 30 and the vehicle body 50. The shock-absorbing member 34 is made of a material such as, for example, rubber or resin. The shock-absorbing member 34 is formed in a disc shape having a bolt insertion through-hole 34a. Of course, the shock-absorbing member may be a shape such as, for example, a rectangular plate shape other than the disc shape. The transfer of the vibration from the vibrator 20 to the vehicle body 50 is suppressed by the shock-absorbing member 34.

Figure 3:
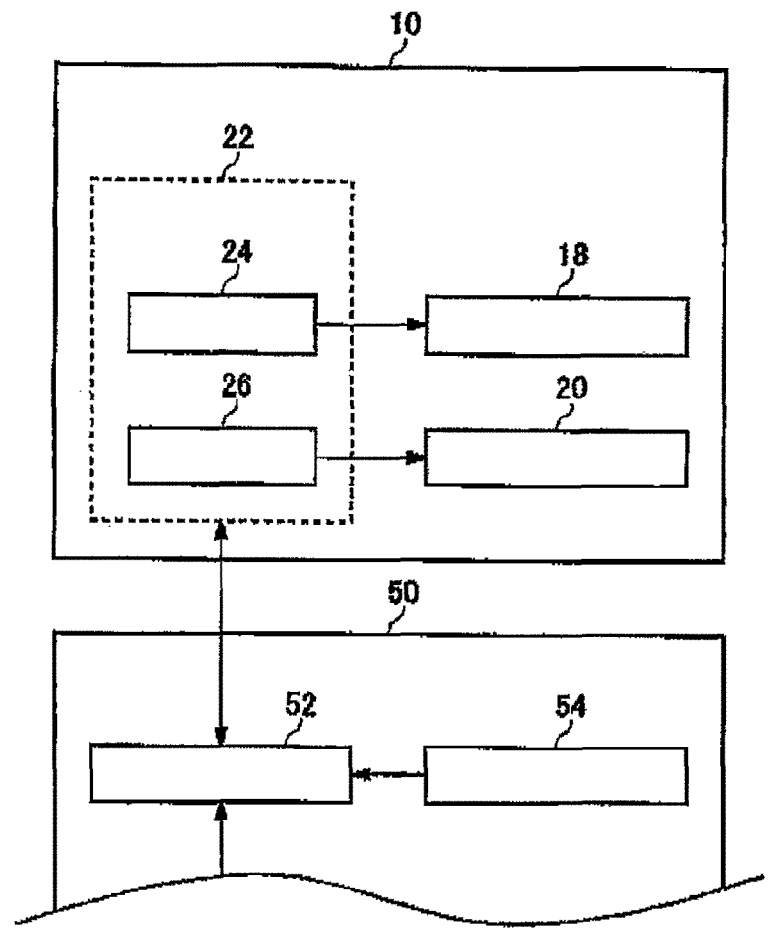
FIG. 3 is a functional block diagram illustrating an operational relationship of a lamp control unit of a vehicular lamp and a vehicular control unit of a vehicle body.

FIG. 3 is a functional block diagram illustrating an operating relationship between the lamp control unit 22 of the vehicular lamp 10 and a vehicular control unit of the vehicle body 50 side. The vehicular lamp 10 executes a radiation control and a sound generation control based on the information obtained from a vehicular control unit 52 of the vehicle body 50. The vehicular control unit 52 and the lamp control unit 22 are connected to be capable of communicating with each other through a CAN ("Controller Area Network"). The lamp control unit 22 includes the radiation control unit 24 and the sound generation control unit 26 as described above.

When the radiation control unit 24 receives an ON/OFF command based on the operation of a light switch 54 by a driver from the vehicular control unit 52, the radiation control unit executes the ON/OFF control of the lamp unit 18. The radiation control unit 26 receives an alarm command from the vehicular control unit 52 and controls the sound generation operation of the vibrator 20 based on the alarm command. More specifically, alternating current is applied to the vibrator 20 and causes the vibrator 20 to vibrate. Here, when the speed of the vehicle becomes a certain speed (for example, 20 km/h) or less, the alarm command is transmitted from the vehicular control unit 52 to the lamp control unit 22.

According to the vehicular lamp 10 of the present exemplary embodiment, an alarm sound notifying the proximity of the vehicle is generated by the vibrator 20. In addition, the transfer of the vibration from the vibrator 20 to the vehicle body 50 is suppressed by the shock-absorbing member 34. As a result, a noise caused by the vibration of the vehicle body 50 is suppressed within the vehicle.

MODIFIED EXAMPLE 1-1

Figure 4:
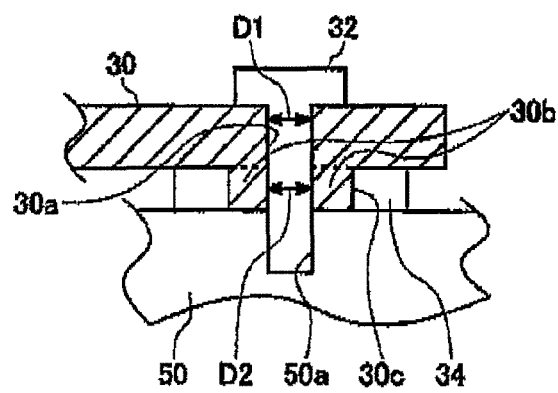
FIG. 4 is an enlarged cross-sectional view illustrating the surroundings of an attachment part of a vehicular lamp according to a modified example of the first exemplary embodiment.

FIG. 4 is an enlarged cross-sectional view illustrating the surroundings of the attachment part 30 of the vehicular lamp according to a modified example of the first exemplary embodiment. In the present modified example, the attachment part 30 has a ring-shaped protrusion 30b at the portion where the bolt insertion hole 30a is formed and the protrusion 30b protrudes towards the vehicle body 50 side. Here, the inner diameter D2 of the ring-shaped protrusion 30b is the same as the diameter D1 of the bolt insertion hole 30a. Of course, the inner diameter D2 and the diameter D1 may be different from each other. The shock-absorbing member 34 is provided such that it covers the outer peripheral surface 30c of the ring-shaped protrusion 30b. That is, even though the shock-absorbing member 34 is provided between the attachment part 30 and the vehicle body 50 in the present modified example, the vehicular lamp 10 is fixed in a state where a portion of the attachment part 30 is still in contact with the vehicle body 50. For this reason, according to the present modified example, the degree of positional precision of attaching the vehicular lamp 10 to the vehicle body 50 may be secured by suppressing the vibration from the vibrator 20.

MODIFIED EXAMPLE 1-2

Figure 5:
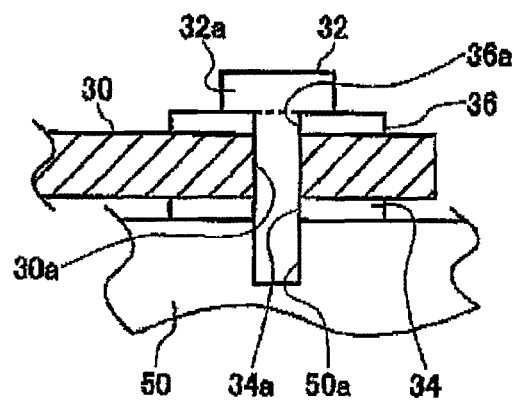
FIG. 5 is an enlarged cross-sectional view illustrating the surroundings of an attachment part of a vehicular lamp according to another modified example of the first exemplary embodiment.

FIG. 5 is an enlarged cross-sectional view illustrating the surroundings of the attachment part 30 of the vehicular lamp according to another modified example of the first exemplary embodiment. In the present modified example, a shock-absorbing member 36 is provided between a head portion 32a of the bolt 32 and the attachment part 30 as well. The shock-absorbing member 36 is made of a material such as, for example, rubber or resin as in the shock-absorbing member 34. The shock-absorbing member 36 is formed in a disc shape having a bolt insertion hole 36a. Also, as in the shock-absorbing member 34, the shock-absorbing member 36 may have a shape such as, for example, a rectangular plate shape other than the disc shape. Meanwhile, the shock-absorbing member 36 and the shock-absorbing member 34 may have different shapes and be made of different materials from each other. For example, the shock-absorbing member 36 may be a disc-shaped and made of rubber member while the shock-absorbing member 34 may be a rectangular plate-shaped and made of resin member. According to the present modified example, the transfer of the vibration to the vehicle body 50 may be further suppressed.

MODIFIED EXAMPLE 1-3

Figure 6:
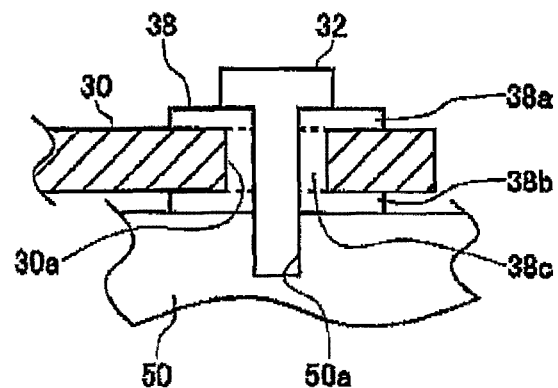
FIG. 6 is an enlarged cross-sectional view illustrating the surroundings of an attachment part of the vehicular lamp according to another modified example of the first exemplary embodiment.

FIG. 6 is an enlarged cross-sectional view illustrating the surroundings of the attachment part 30 of the vehicular lamp according to another modified example of the first exemplary embodiment. In the present modified example, a shock-absorbing member 38 is formed in a cylindrical shape provided with flange portions 38a, 38b at the both ends thereof The shock-absorbing member 38 is fixed to the attachment part 30 such that the small diameter portion 38c between the flange portions 38a, 38b is inserted into the bolt insertion through-hole 30a. In the present modified example, as depicted in FIG. 6, the attachment part 30 and the vehicle body 50 are not in contact with each other through a rigid body. As a result, the transfer of the vibration to the vehicle body 50 may be further suppressed.

Figure 7:
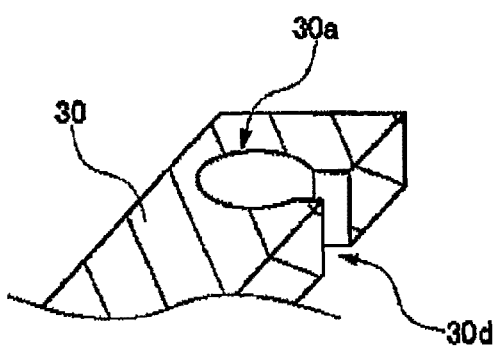
FIG. 7 is an enlarged perspective view illustrating the surroundings of a bolt insertion through-hole of an attachment part.

Herein, descriptions will be made as to an example of a method of fixing a member such as the shock-absorbing member 38 having flange portions 38a, 38b at both ends to the attachment part 30 as depicted in FIG. 6. FIG. 7 is an enlarged perspective view illustrating the surroundings of the bolt insertion through-hole 30a of the attachment part 30. As depicted in FIG. 7, the attachment part 30 is provided with a slit 30d that is communicated with the bolt insertion through-hole 30a from a lateral side thereof The shock-absorbing member 38 is pushed into the bolt insertion through-hole from the slit 30d and fixed to the attachment part 30.

MODIFIED EXAMPLE 1-4

Figure 8:
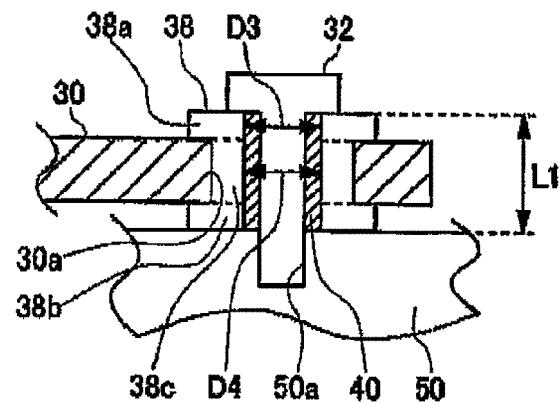
FIG. 8 is an enlarged cross-sectional view illustrating the surroundings of an attachment part of a vehicular lamp according to another modified example of the first exemplary embodiment.

FIG. 8 is an enlarged cross-sectional view illustrating the surroundings of the attachment part 30 of the vehicular lamp according to another modified example of the first exemplary embodiment. In the present modified example, a cylindrical metal vessel 40 of which the outer diameter D3 is approximately the same as the inner diameter D4 of the shock-absorbing member 38 is provided in the shock-absorbing member 38. The cylindrical metal vessel 40 is made of, for example, stainless steel or aluminum. Also in the present modified example, the attachment part 30 may be provided with the slit 30d as depicted in FIG. 7.

The present modified example may have the same effect as that of the modified example 1-3. In addition, according to the present modified example, the pressed amount of the shock-absorbing member 38 when the bolt is fastened may be controlled. That is, by providing the cylindrical metal vessel 40, the shock-absorbing member 38 is not pressed until the axial direction length thereof becomes the axial direction length L1 of the cylindrical metal vessel 40 or less. Thus, the degree of positional precision of attaching the vehicular lamp 10 to the vehicle body 50 may be secured.

MODIFIED EXAMPLE 1-5

Figure 9:
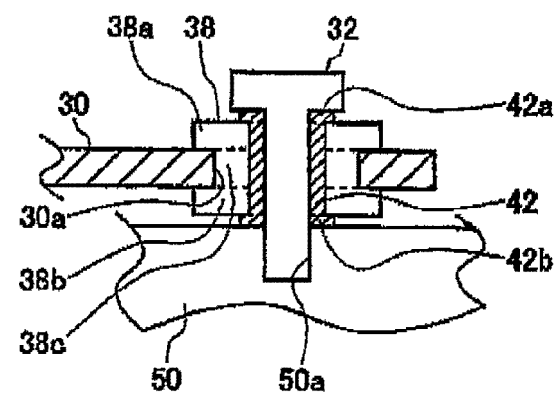
FIG. 9 is an enlarged cross-sectional view illustrating the surroundings of an attachment part of a vehicular lamp according to another modified example of the first exemplary embodiment.

FIG. 9 is an enlarged cross-sectional view illustrating the surroundings of the attachment part 30 of the vehicular lamp according to another modified example of the first exemplary embodiment. In the present modified example, a cylindrical metal vessel 42 is provided in the shock-absorbing member 38 as in the modified example 1-4. The cylindrical metal vessel 42 is inserted into the shock-absorbing member 38 and then pressed at the top and bottom ends thereof to form flange portions 42a, 42b and to be fixed to the shock-absorbing member 38. Also in the present modified example, the attachment part 30 may be provided with the slit 30d as depicted in FIG. 7.

The present modified example may have the same effect as that of the modified example 1-4. In addition, according to the present modified example, since the shock-absorbing member 38 and the cylindrical metal vessel 40 are fixed to the attachment part 30, workability when attaching the vehicular lamp 10 to the vehicle body 50 is enhanced.

MODIFIED EXAMPLE 1-6

Although the first exemplary embodiment exemplified the shock-absorbing member 34 provided between the attachment part 30 and the vehicle body 50, the shock-absorbing member may be provided between the other component of the vehicular lamp and the vehicle body 50. For example, the shock-absorbing member may be provided between the outer lens 14 and the vehicle body 50 (for example, a vehicular body panel). Typically, a gap is provided between the outer lens 14 and the vehicle body 50 such that the outer lens 14 and the vehicle body 50 do not come into contact with each other. However, due to various factors such as, for example, a problem of the degree of precision when assembling the vehicle body, the outer lens 14 and the vehicle body 50 may come into contact temporarily or continuously. As a result, the vibration from the vibrator 20 may be transferred to the vehicle body 50 through the outer lens 14. Therefore, the transfer of the vibration to the vehicle body 50 may be suppressed by providing the shock-absorbing member between the outer lens 14 and the vehicle body 50.

MODIFIED EXAMPLE 1-7

Although the first exemplary embodiment illustrates an example in which the vibrator 20 is directly fixed to the lamp body 12, the present disclosure is not limited thereto. For example, a retaining part that retains the vibrator 20 may be provided and welded to ribs formed on a component such as, for example, the lamp body 12 to fix the vibrator 20. In this case, the vibration generated from the vibrator 20 may be transferred to the component easily when a plurality of ribs are formed and the retaining part is welded to the plural ribs. However, a loud allophone from the component of the vehicular lamp may be generated to the contrary. Thus, the shock-absorbing member disclosed in the present disclosure plays a significant role to suppress allophone.

[Second Exemplary Embodiment]

The main difference between the vehicular lamp 10 according to the first exemplary embodiment and the vehicular lamp 210 according to the second exemplary embodiment is the location where the shock-absorbing member is provided. In the second exemplary embodiment, the shock-absorbing member is provided at the portion where components of the vehicular lamp 210 are in contact with each other. Herein, descriptions will be made as to a case in which the shock-absorbing member is provided at the portion where the extension member and the outer lens come in contact with each other as an example.

Figure 10:
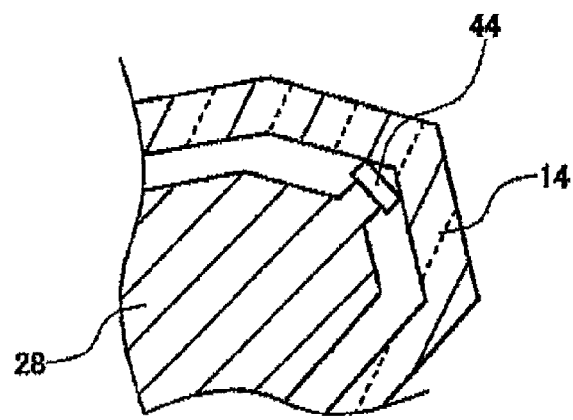
FIG. 10 is an enlarged cross-sectional view illustrating a portion where an extension member and an outer lens of a vehicular lamp according to a second exemplary embodiment are in contact with each other.

FIG. 10 is an enlarged cross-sectional view illustrating the portion where the extension member 28 and the outer lens 14 of the vehicular lamp 210 according to the second exemplary embodiment are in contact with each other. As depicted in FIG. 10, a shock-absorbing member 44 is provided at the portion where the extension member 28 and the outer lens 14 are in contact with each other. The material of the shock-absorbing member 44 is the same as the material of the shock-absorbing member 34 of the first exemplary embodiment.

According to the vehicular lamp 210 of the present embodiment, the shock-absorbing member 44 may reduce the vibration from the vibrator 20, which may in turn attenuate the vibration transferred to the vehicle body 50 side, thereby reducing the noise within the vehicle caused from the vibration of the vehicle body 50. Also, since collision may be suppressed at the portion where the extension member 28 and the outer lens 14 come into contact with each other, the generation of the allophone by the collision may be suppressed.

Meanwhile, when the vibrator 20 is attached to the outer lens 14, the outer lens 14 vibrates with large amplitude and generates a sound. At this time, even though the vibration transferred to the extension member 28 fixed to the outer lens 14 also increases, the t acting effect of suppressing the generation of allophone may also be obtained by the shock-absorbing member 44.

MODIFIED EXAMPLE 2-1

Figure 11:
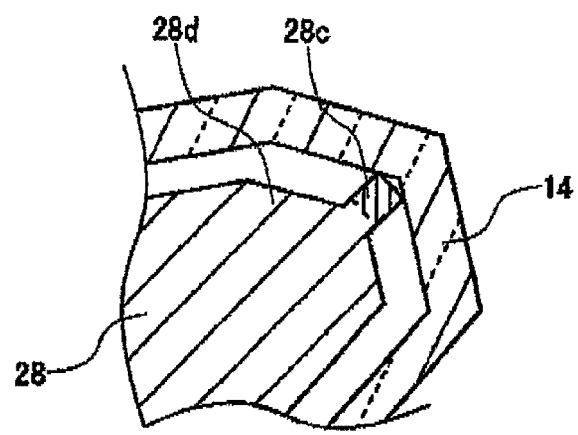
FIG. 11 is an enlarged cross-sectional view illustrating a portion where an extension member and an outer lens of a vehicular lamp according to a modified example of the second exemplary embodiment are in contact with each other.

FIG. 11 is an enlarged cross-sectional view illustrating the portion where the extension member 28 and an outer lens 14 of the vehicular lamp according to a modified example of the second exemplary embodiment are in contact with each other. In the present modified example, a portion 28c of the extension member 28 that is in contact with the outer lens 14 is made of a softer resin as compared to the main body portion 28d of the extension member 28. In other words, the extension member 28 of the present modified example is formed integrally with the shock-absorbing member. According to the present modified example, the same effect as that of the vehicular lamp 210 according to the second exemplary embodiment is obtained.

MODIFIED EXAMPLE 2-2

The second exemplary embodiment illustrates an example of the shock-absorbing member provided at the portion where the extension member 28 and the outer lens 14 are in contact with each other. However, the extension member 28 itself may function as a shock-absorbing member without providing a separate shock-absorbing member. Specifically, some portions thicker than the surroundings are provided on the extension member 28. That is, the thickness of the extension member 28 is caused to be non-uniform about on the extension member 28. By doing so, the vibration from the vibrator 20 may be attenuated. That is, the extension member 28 functions as the shock-absorbing member. According to the present modified example, the same effect as that of the vehicular lamp 210 according to the second exemplary embodiment is obtained.

MODIFIED EXAMPLE 2-3

The second exemplary embodiment illustrates an example in which the extension member 28 and the outer lens 14 come in contact with each other, i.e., the extension member 28 is fixed to the outer lens 14. However, the extension member 28 may be fixed to the lamp body 12 which is made of a softer resin compared to the outer lens 14.

[Third Exemplary Embodiment]

The main difference between the vehicular lamp 10 according to the first exemplary embodiment and the vehicular lamp 310 according to the third exemplary embodiment is the location where the shock-absorbing member is provided.

Figure 12:
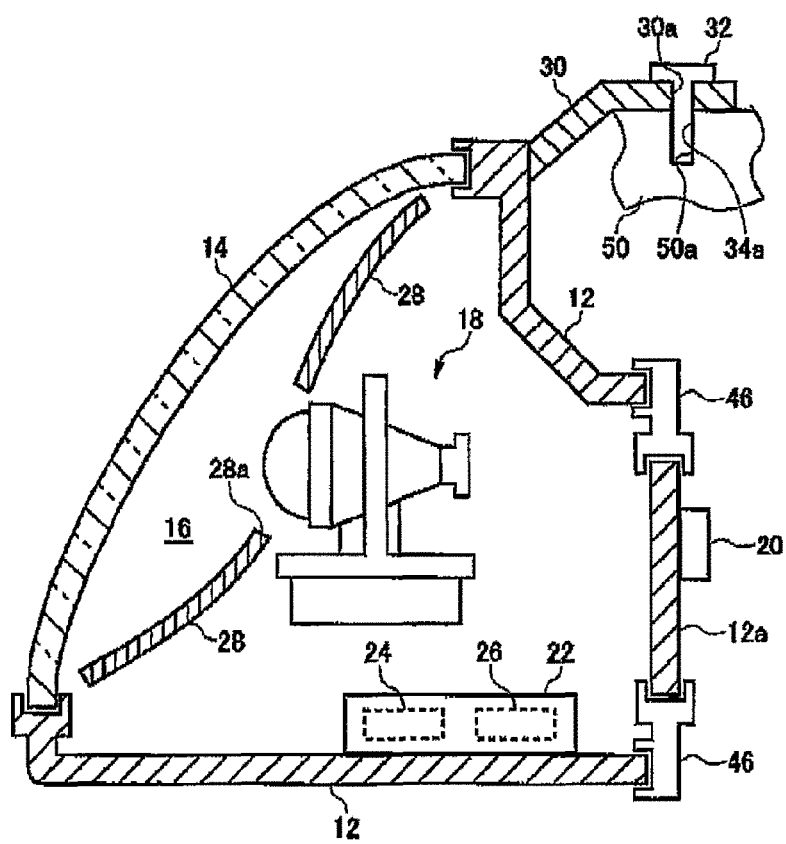
FIG. 12 is a vertical cross-sectional view illustrating a schematic configuration of a vehicular lamp according to a third exemplary embodiment.

FIG. 12 is a vertical cross-sectional view illustrating a schematic configuration of the vehicular lamp 310 according to the third exemplary embodiment. FIG. 12 corresponds to FIG. 1.

In the third exemplary embodiment, the lamp body 12 has a detachable cover 12a at the rear side of the vehicle thereof At the portion where the detachable cover 12a and the lamp body 12 are in contact with each other, a shock-absorbing member 46 is provided. That is, the shock-absorbing member 46 is provided between a component provided with the vibrator 20 and another component. The material of the shock-absorbing member 46 is the same as the shock-absorbing member 34 in the first exemplary embodiment.

Since the vehicular lamp 310 according to the third exemplary embodiment is provided with the shock-absorbing member 46 between the detachable cover 12a provided with the vibrator 20 and the lamp body 12, the transfer of the vibration of the vibrator 20 to the lamp body 12, even further to the vehicle body 50 or other components is suppressed. Also, the vibrator 20 may be fixed to the lamp chamber 16 side of the detachable cover 12a.

[Fourth Exemplary Embodiment]

The main differences between the vehicular lamp 10 according to the first exemplary embodiment and the vehicular lamp 410 according to the fourth exemplary embodiment are the configuration of the attachment part 30 and the presence/absence of the shock-absorbing member 34.

Figure 13:
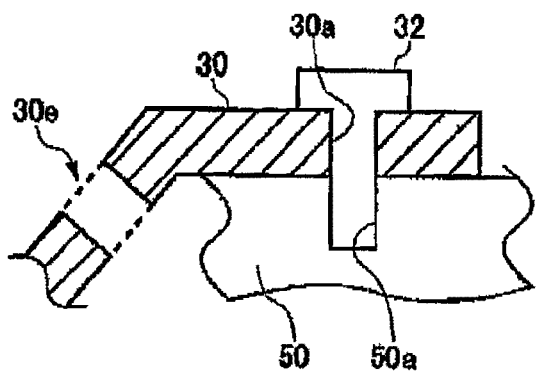
FIG. 13 is an enlarged cross-sectional view illustrating the surroundings of an attachment part of a vehicular lamp according to a fourth exemplary embodiment.

FIG. 13 is an enlarged cross-sectional view illustrating the surroundings of the attachment part of the vehicular lamp 410 according to the fourth exemplary embodiment. As depicted in FIG. 13, the vehicular lamp 410 does not have the shock-absorbing member. Instead, an opening 30e is formed at the attachment part 30. Thus, it is expected that the vibration from the vibrator 20 may be attenuated. Meanwhile, the location, the size, the shape, and the number of the opening 30e may be determined by experiments.

[Fifth Exemplary Embodiment]

The main difference between the vehicular lamp 410 according to the fourth exemplary embodiment and the vehicular lamp 510 according to the fifth exemplary embodiment is the configuration of the attachment part 30.

Figure 14:
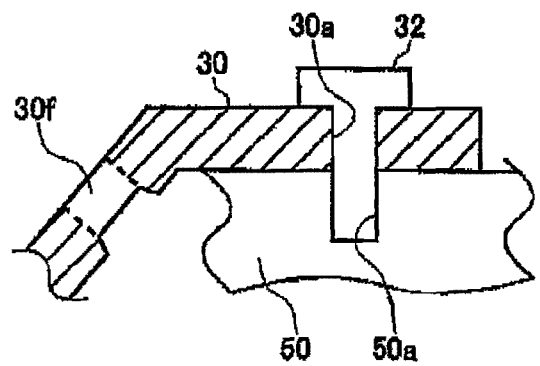
FIG. 14 is an enlarged cross-sectional view illustrating the surroundings of an attachment part of a vehicular lamp according to a fifth exemplary embodiment.

FIG. 14 is an enlarged cross-sectional view illustrating the surroundings of the attachment part of the vehicular lamp 510 according to the fifth exemplary embodiment. As depicted in FIG. 14, the attachment part 30 is formed with a thin portion 30f which is thinner than the other portion. By making the thickness of the attachment part non-uniform, the vibration from the vibrator 20 is attenuated. A thick portion that is thicker than other portion may well be provided. Alternatively, both the thin portion 30f and the thick portion may be provided. In addition, the location, size, shape and number of the thin portion 30f and thick portion may be determined by experiments as well.

[Sixth Exemplary Embodiment]

The main difference between the vehicular lamp 410 according to the fourth exemplary embodiment and the vehicular lamp 610 according to the sixth exemplary embodiment is the configuration at the attachment part 30.

Figure 15:
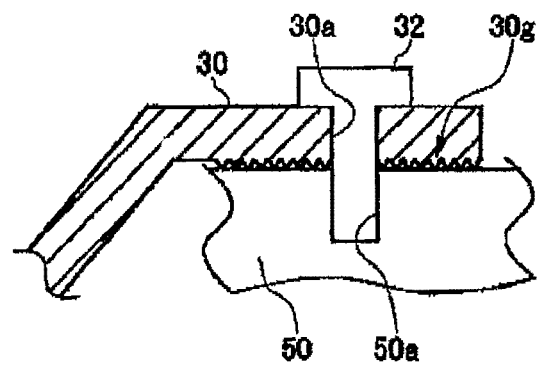
FIG. 15 is an enlarged cross-sectional view illustrating the surroundings of an attachment part of a vehicular lamp according to a sixth exemplary embodiment.

FIG. 15 is an enlarged cross-sectional view illustrating the surroundings of the attachment part of the vehicular lamp 610 according to the sixth exemplary embodiment. The attachment part 30 has a plurality of convex portions 30g on the surface of the vehicle body 50 side. That is, the plural convex portions 30g are in contact with the vehicle body 50. By lessening the contact area with the vehicle body 50, it is expected that the transfer of the vibration to the vehicle body 50 side is suppressed.

[Seventh Exemplary Embodiment]

Figure 16:
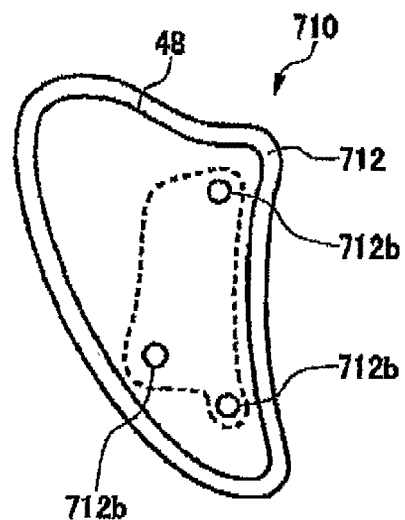
FIG. 16 is a view of a vehicular lamp according a seventh exemplary embodiment seen from a lamp body side.

FIG. 16 illustrates the vehicular lamp 710 according the seventh exemplary embodiment seen from the lamp body side. The vehicular lamp 710 according to the seventh exemplary embodiment is a rear combination lamp having functions such as a back lamp and a stop lamp.

Conventionally, for the water-proof purpose, a rubber sheet is provided between the lamp and the vehicle body 50 such that it covers bulb insertion openings 712b as depicted with a dotted line in FIG. 16. In the present exemplary embodiment, a rubber sheet 48 is provided between the lamp body 712 and the vehicle body 50 such that the rubber sheet covers the entire lamp body 712 of the rear combination lamp. Thus, the transfer of the vibration to the vehicle body 50 side is suppressed.

[Eighth Exemplary Embodiment]

The main differences between the vehicular lamp 10 according to the first exemplary embodiment and a vehicular lamp 810 according to the eighth exemplary embodiment are the location and method of fixing the vibrator, and the location where the shock-absorbing member is provided.

Figure 17:
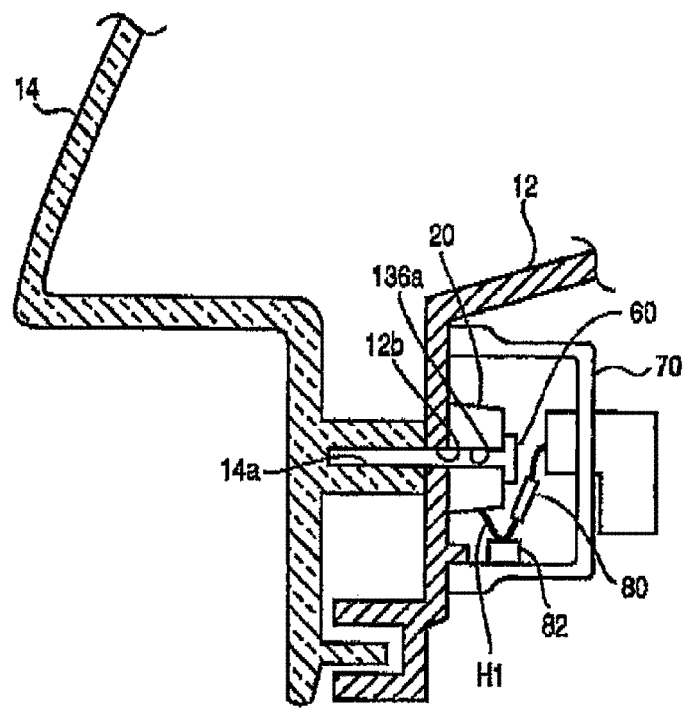
FIG. 17 is an enlarged cross-sectional view illustrating the surroundings of a lower part of an outer lens of a vehicular lamp according to an eighth exemplary embodiment.

FIG. 17 is an enlarged cross-sectional view illustrating the surroundings of a lower part of the outer lens 14 of the vehicular lamp 810 according to the eighth exemplary embodiment.

The vibrator 20 is compressed against the lamp body 12 by a bolt 60 screwed into a screw hole 14a and compresses the lamp body 12 against the outer lens 14. In other words, the bolt 60 is inserted through the insertion hole 136a of the vibrator 20 and a hole 12b formed in the lamp body 12 and screws into the screw hole 14a of the outer lens 14, thereby fastening the vibrator 20 and the lamp body 12 to the outer lens 14. Thus, the vibrator 20 is capable of vibrating the outer lens 14 through the lamp 12 and the bolt 60 so that a sound may be generated towards the front of the vehicular lamp 810. Also, since the attachment of the vibrator 20 and the fixation of the lamp body 12 and the outer lens 14 may be carried out in a single process, the processing cost may be reduced. Further, since the outer lens 14, the lamp body 12, and the vibrator 20 may be fixed by one bolt 60, the material cost may be reduced.

The vibrator 20 is surrounded by a detachable cover 70 formed as a predetermined shape substantially in a cup shape. The harness H1 connected to the vibrator 20 is drawn out to the exterior through the cover 70. Since the harness H1 is connected to the vibrator 20, the vibration of the vibrator 20 may be transferred to the harness H1.

The harness H1 is provided with a shock-absorbing member 80. The shock-absorbing member 80 is a sheet made of, for example, a rubber and wound around the harness H1. Also, the cover 70 is provided with a shock-absorbing member 82 such that the harness H1 is not directly in contact with the cover. The shock-absorbing member 82 is made of, for example, a rubber. Also, any one of the shock-absorbing member 80 and the shock-absorbing member 82 may be provided.

According to the vehicular lamp 810 of the eighth exemplary embodiment, an alarm sound notifying the proximity of the vehicle is generated by the vibrator 20. In addition, according to the vehicular lamp 810 of the eighth exemplary embodiment, the vibration of the harness H1 is suppressed since the harness H1 is provided with the shock-absorbing member 80. Thus, the collision of the harness H1 and the cover 70 may be suppressed so that the generation of allophone by the collision may be suppressed. Also, since the vibration of the harness H1 is suppressed, the vibration transferred from the harness H1 to the cover 70 may be reduced. As a result, the generation of allophone by the vibration of the cover 70 may be suppressed.

Also, according to the vehicular lamp 810 of the eighth exemplary embodiment, the vibration of the harness H1 transferred to the cover 70 is suppressed since the shock-absorbing member 82 is provided between the harness H1 and the cover 70. Also, the collision of the harness H1 and the cover 70 may be suppressed so that the generation of allophone by the collision may be suppressed.

[Ninth Exemplary Embodiment]

The main differences between the vehicular lamp 810 according to the eighth exemplary embodiment and the vehicular lamp 910 according to the ninth exemplary embodiment are the method of fixing the vibrator and the location where the shock-absorbing member is provided.

Figure 18:
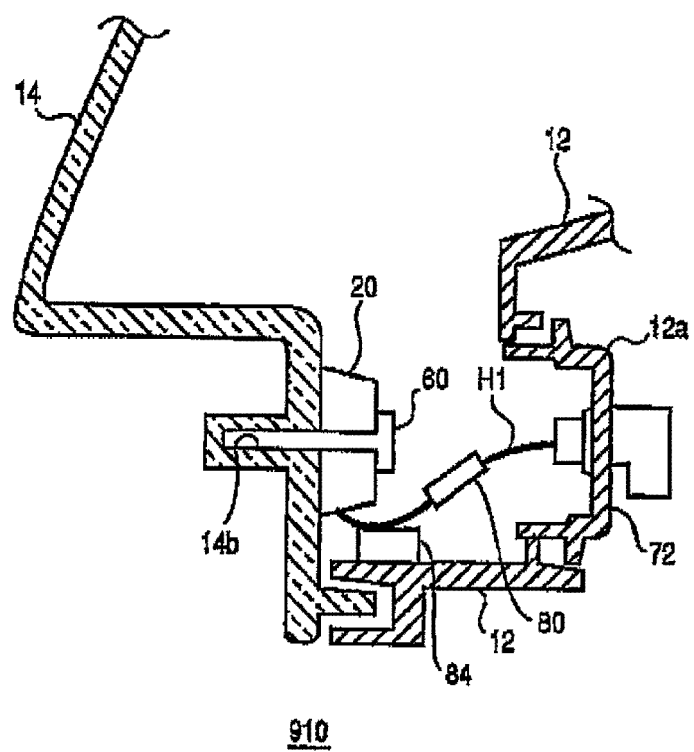
FIG. 18 is an enlarged cross-sectional view illustrating the surroundings of a lower part of an outer lens of a vehicular lamp according to a ninth exemplary embodiment.

FIG. 18 is an enlarged cross-sectional view illustrating the surroundings of a lower part of the outer lens 14 of the vehicular lamp 910 according to the ninth exemplary embodiment.

The vibrator 20 is compressed against the rear side of the outer lens 14 by the bolt 60 screwed into a screw hole 14b formed in the outer lens 14. Thus, the vibrator 20 is capable of vibrating the outer lens 14 so that a sound may be generated towards the front side of the vehicular lamp 910.

The lamp body 12 is provided with a detachable cover 72. More specifically, the cover 72 is provided at the location which faces the vibrator 20 in the horizontal direction behind the vibrator 20. The harness H1 connected to the vibrator 20 is drawn out to the exterior through the cover 72. Since the harness H1 is connected to the vibrator 20, the vibration of the vibrator 20 may be transferred to the harness H1.

As in the eighth exemplary embodiment, the harness H1 is provided with the shock-absorbing member 80. Also, the lamp body 12 is provided with a shock-absorbing member 84 such that the harness H1 is not directly in contact with the lamp body 12. The shock-absorbing member 84 corresponds to the shock-absorbing member 82. Of course, any one of the shock-absorbing member 80 and the shock-absorbing member 84 may be provided.

According to the vehicular lamp 910 of the ninth exemplary embodiment, the same effect as that of the vehicular lamp 810 may be exhibited.

[Tenth Exemplary Embodiment]

The main differences between the vehicular lamp 810 according to the eighth exemplary embodiment and the vehicular lamp 1010 according to the tenth exemplary embodiment are the location and method of fixing the vibrator and the location where the shock-absorbing member is provided.

Figure 19:
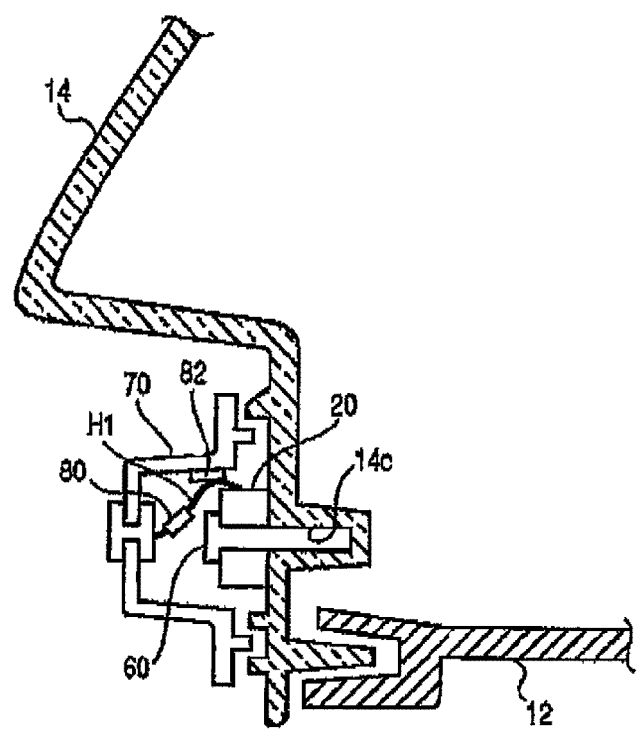
FIG. 19 is an enlarged cross-sectional view illustrating the surroundings of a lower part of an outer lens of a vehicular lamp according to a tenth exemplary embodiment.

FIG. 19 is an enlarged cross-sectional view illustrating the surroundings of a lower part of the outer lens 14 of the vehicular lamp 1010 according to the tenth exemplary embodiment.

The vibrator 20 is compressed against the front side of the outer lens 14 by the bolt 60 screwed into a screw hole 14c formed in the outer lens 14. Thus, the vibrator 20 is capable of vibrating the outer lens 14 so that a sound may be generated towards the front side of the vehicular lamp 1010.

As in the eighth exemplary embodiment, the vibrator 20 is surrounded by the cover 70. The harness H1 connected to the vibrator 20 is drawn out to the exterior through the cover 70. Also, as in the eighth exemplary embodiment, the harness H1 is provided with the shock-absorbing member 80. Further, the cover 70 is provided with the shock-absorbing member 82. Of course, either of the shock-absorbing member 80 and the shock-absorbing member 82 may be provided.

According to the vehicular lamp 1010 of the tenth exemplary embodiment, the same functional effect as that of the vehicular lamp 810 is exhibited.

[Eleventh exemplary embodiment]

The main differences between the vehicular lamp 10 according to the first exemplary embodiment and the vehicular lamp 1110 according to an eleventh exemplary embodiment are the fixation location and the fixation method of the vibrator and the location where the shock-absorbing member is provided.

Figure 20:
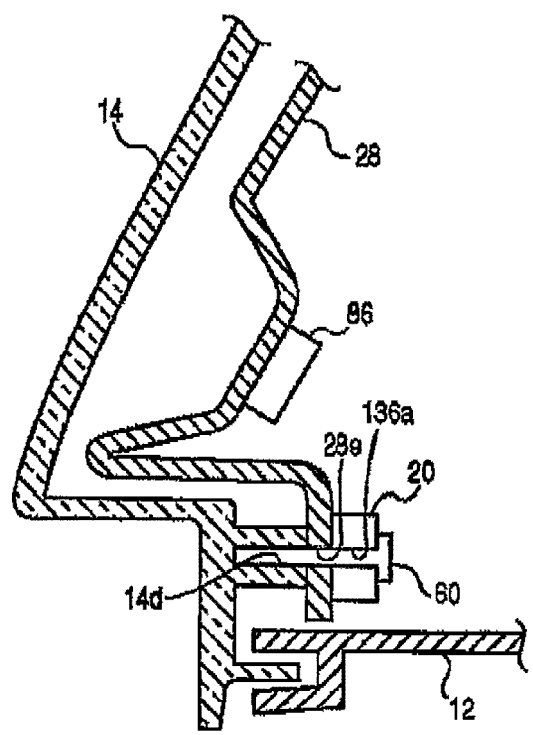
FIG. 20 is an enlarged cross-sectional view illustrating the surroundings of a lower part of an outer lens of a vehicular lamp according to an eleventh exemplary embodiment.

FIG. 20 is an enlarged cross-sectional view illustrating the surroundings of a lower part of the outer lens 14 of the vehicular lamp 1110 according to the eleventh exemplary embodiment.

The vibrator 20 is compressed against the extension member 28 by the bolt 60 screwed into a screw hole 14d formed on the outer lens 14 and compresses the extension member 28 against the outer lens 14. In other words, the bolt 60 is inserted through the insertion through-hole 136a of the vibrator 20 and a hole 28e formed in the extension member 28, and connected again to the screw hole 14d of the outer lens 14, thereby fastening the vibrator 20 and the extension member 28 to the outer lens 14. Thus, the vibrator 20 is capable of vibrating the outer lens 14 through the extension member 28 and the bolt 60 so that a sound is generated towards the front side of the vehicular lamp 1110. Also, since the attachment process of the vibrator 20 and the fixation process of the outer lens 14 and the extension member 28 may be carried out in a single process, the processing cost may be reduced. Further, since the outer lens 14, the extension member 28, and the vibrator 20 may be fixed by one bolt 60, the material cost may be reduced.

The extension member 28 is provided with a shock-absorbing member 86. Meanwhile, to secure the beauty of the appearance, the shock-absorbing member 86 may be provided at the portion which is not recognizable with naked eyes from the exterior of the vehicular lamp 1110. Here, the shock-absorbing member 86 is provided at the rear side of the extension member 28.

According to the vehicular lamp 1110 of the eleventh exemplary embodiment, the vibrator 20 generates an alarm sound notifying the proximity of the vehicle. In addition, according to the vehicular lamp 1110 of the eleventh exemplary embodiment, since the extension member 28 is provided with the shock-absorbing member 86, the vibration of the extension member 28 is suppressed. Thus, the collision of the extension member 28 and the other component of the vehicular lamp 1110 may be suppressed so that the generation of allophone by the collision may be suppressed.

[Twelfth Exemplary Embodiment]

Figure 21:
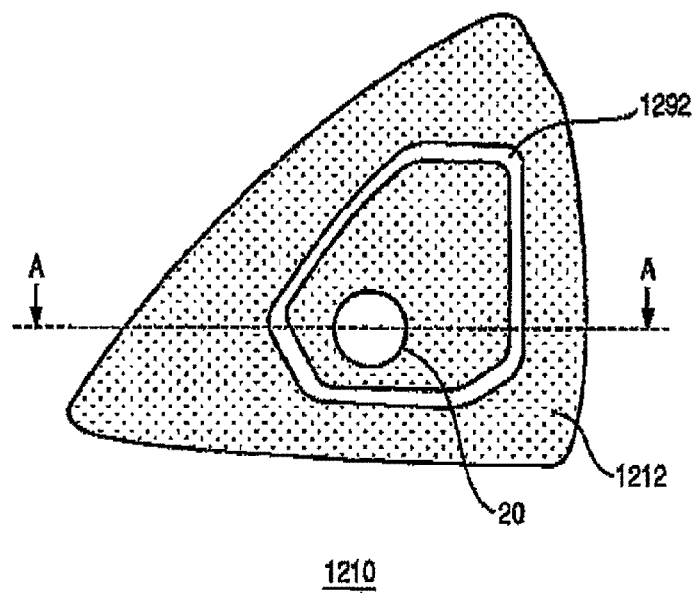
FIG. 21 is a view of a vehicular lamp according to a twelfth exemplary embodiment seen from a lamp body side.
Figure 22:
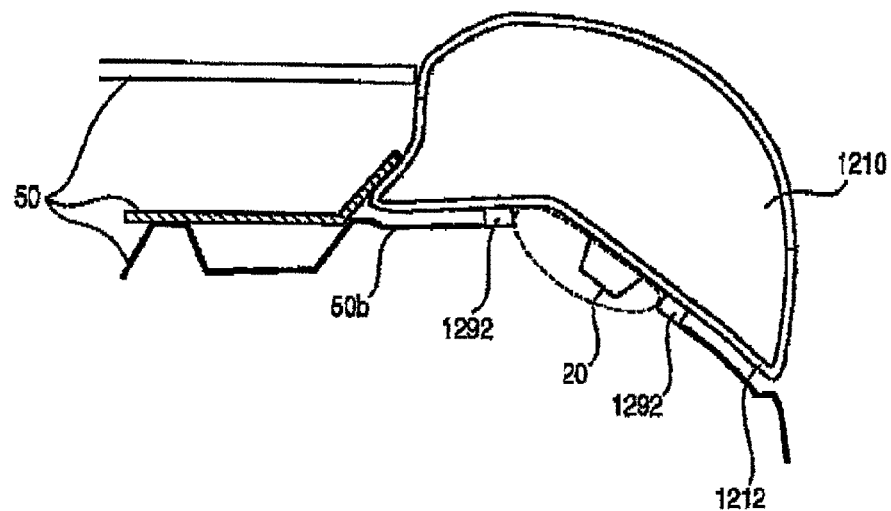
FIG. 22 is a cross-sectional view illustrating a state in which the vehicular lamp of FIG. 21 is attached to a vehicle e body.

FIG. 21 illustrates the vehicular lamp 1210 according to the twelfth exemplary embodiment seen from the lamp body side. FIG. 22 is a cross-sectional view illustrating a state in which the vehicular lamp 1210 is attached to the vehicle body 50. The cross-section of the vehicular lamp 1210 depicted in FIG. 22 corresponds to a cross-section taken along the line A-A of FIG. 21. Meanwhile, in FIG. 22, each component provided inside the vehicular lamp 1210 is omitted. The vehicular lamp 1210 of the present exemplary embodiment is a rear combination lamp having functions of, for example, a back lamp or a stop lamp.

A packing 1292 formed in a ring shape is attached to the lamp body 1212. The packing 1292 is made of, for example, a rubber. A waterproof region (the section surrounded by the dotted line) is formed by the packing 1292, the lamp body 1212, and the vehicular panel 50b of the vehicle body 50. The vibrator 20 is provided on the rear surface of the lamp body 1212 which corresponds to the waterproof region. That is, the vibrator 20 is provided at a waterproof location which is not recognizable with naked eyes from the exterior when the vehicular lamp 1210 is attached to the vehicle body.

According to the vehicular lamp 1210 of the twelfth exemplary embodiment, the vibrator 20 generates an alarm sound notifying the proximity of the vehicle towards the rear of the vehicle body 50. In addition, according to the vehicular lamp 1210 of the twelfth exemplary embodiment, the transfer of the vibration from the vibrator 20 to the vehicle body 50 is suppressed by the packing 1292. That is, the packing 1292 functions as a shock-absorbing member.

Also, according to the vehicular lamp 1210 of the twelfth exemplary embodiment, the vibrator 20 is provided on the rear surface of the lamp body 1212. That is, the lamp body is provided at a location on the outer surface of the vehicular lamp 1210 which is not recognizable with naked eyes when the vehicular lamp 1210 is attached to the vehicle body 50. Thus, the beauty of the appearance of the vehicular lamp 1210 is secured. Also, the vibrator 20 is provided on a portion of the rear surface of the lamp body 1212 which is surrounded by the packing 1292. Thus, the waterproof of the vibrator 20 attached to the outer surface of the vehicular lamp 1210 may be implemented without increasing the cost or at a relatively low cost.

[Thirteenth Exemplary Embodiment]

The main differences between the vehicular lamp 10 according to the first exemplary embodiment and the vehicular lamp 1310 according to the thirteenth exemplary embodiment are the location of fixing the vibrator and the location where the shock-absorbing member is provided.

Figure 23:
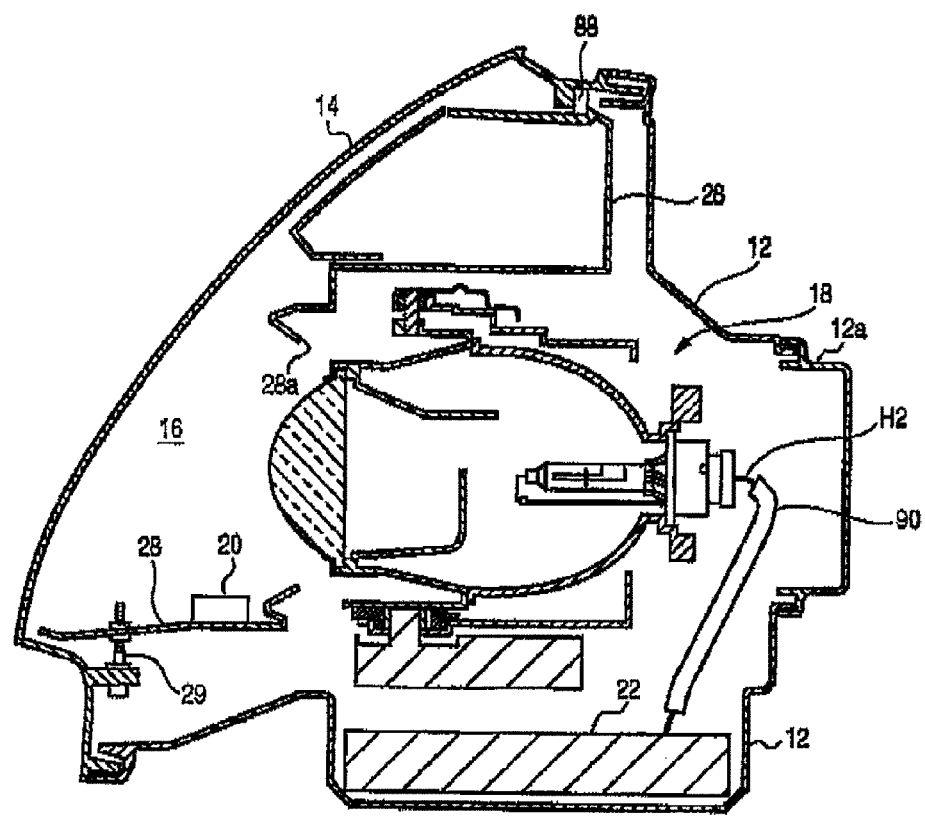
FIG. 23 is a view illustrating a vehicular lamp according to a thirteenth exemplary embodiment.

FIG. 23 is a view illustrating the vehicular lamp 1310 according to the thirteenth exemplary embodiment. FIG. 23 corresponds to FIG. 1.

The vibrator 20 is provided on the extension member 28. In the depicted example, the vibrator is provided on the surface located below the opening 28a on the outer lens 14 side. That is, the vibrator 20 is provided at a location which is recognizable with the naked eye from the exterior of the vehicular lamp 1310.

The extension member 28 is fixed to the outer lens 14 by a screw 29 below the opening 28a. Thus, the vibrator 20 is capable of vibrating the extension member 28 and the outer lens 14 through the screw 29 so that a sound may be generated towards the front side of the vehicular lamp 1310.

Meanwhile, since the outer lens 14 and the extension member 28 above the opening 28a are not fixed, both the outer lens and the extension member may collide. Therefore, a shock-absorbing member 88 is provided between the outer lens 14 and the extension member 28 above the opening 28a.

The lamp unit 18 and the lamp control unit 22 are electrically connected by a harness H2. The vibration from the vibrator 20 may be transferred to the harness H2 through the outer lens 14 and the lamp body 12. The harness H2 is provided with a shock-absorbing member 90. Also, another harness not illustrated in FIG. 23 may be provided with the shock-absorbing member 90.

According to the vehicular lamp 1310 of the thirteenth exemplary embodiment, the vibrator 20 generates an alarm sound notifying the proximity of the vehicle. In addition, according to the vehicular lamp 1310 of the thirteenth exemplary embodiment, since the shock-absorbing member 88 is provided between the outer lens 14 and the extension member 28 above the opening 28a, the collision of the outer lens 14 and the extension member 28 may be suppressed so that the generation of allophone by the collision may be suppressed. Also, since the harness H2 is provided with the shock-absorbing member 90, the vibration of the harness H2 is suppressed, the collision of the harness H2 and the other components of the vehicular lamp 1310 may be suppressed so that the generation of allophone by the collision may be suppressed.

MODIFIED EXAMPLE 13-1

Although the thirteenth exemplary embodiment exemplifies the vibrator 20 provided on the surface of the outer lens 14 side of the extension member 28, the present disclosure is not limited thereto. For example, the vibrator may be provided on the bottom surface of the extension member 28 (the surface opposite to the outer lens 14), that is, the location where the vibrator is not recognizable with naked eyes from the exterior of the vehicular lamp 1310. In this case, the extension member 28 may be provided with a protrusion on the bottom surface thereof and the vibrator 20 may be fixed to the protrusion. Also, when the extension member 28 is fixed to the outer lens 14, the outer lens 14, the extension member 28, and the vibrator 20 may be fastened to each other by a single bolt. When the extension member 28 is fixed to the lamp body 12, the lamp body 12, the extension member 28, and the vibrator 20 may be fastened to each other by a single bolt. At this time, each of the extension member 28 and a component such as, for example, the lamp unit 18 or the lamp body 12 may be provided with a shock-absorbing member.

The present disclosure is not limited to each exemplary embodiment described above. Any proper combination of the elements of each exemplary embodiment is also valid for an exemplary embodiment of the present disclosure. Also, any modifications such as, for example, various design changes may be made based on the knowledge of a person skilled in the art and an exemplary embodiment to which such modifications are made may be included in the scope of the present disclosure as well.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp of a vehicle having a vehicle body, comprising:
   a component of the vehicular lamp connected to the vehicle body;
   a vibrator attached to the component of the vehicular lamp consisting a sound generating system and configured to generate an alarm sound by vibrating the component of the vehicular lamp, thereby notifying the proximity of the vehicle that the vehicle is approaching; and
   a vibration transfer suppression mechanism disposed between the component and the vehicle body and configured to suppress the transfer of vibration caused by the vibrator from the component to the vehicle body.

2. The vehicular lamp of claim 1, wherein the vibration transfer suppression mechanism is provided at an attachment part attaching the vehicular lamp to the vehicle body.

3. The vehicular lamp of claim 1, wherein the vibration transfer suppression mechanism is provided at a portion where the component of the vehicular lamp is in contact with other component.

4. The vehicular lamp of claim 1, wherein the vibration transfer suppression mechanism is provided to a harness configured to electrically connect the component and the vibrator, or the component and other component.

5. The vehicular lamp of claim 1, wherein the vibrator is attached to a first component of a lamp body, and the vibration transfer suppression mechanism is provided at a portion where the first component is in contact with a second component of the lamp body.

6. The vehicular lamp of claim 1, wherein the vibration transfer suppression mechanism includes a shock-absorbing member.

7. The vehicular lamp of claim 2, wherein the vibration transfer suppression mechanism includes a shock-absorbing member.

8. The vehicular lamp of claim 3, wherein the vibration transfer suppression mechanism includes a shock-absorbing member.

9. The vehicular lamp of claim 4, wherein the vibration transfer suppression mechanism includes a shock-absorbing member.

10. The vehicular lamp of claim 5, wherein the vibration transfer suppression mechanism includes a shock-absorbing member.

11. The vehicular lamp of claim 1, wherein the vibration transfer suppression mechanism includes an opening.

12. The vehicular lamp of claim 2, wherein the vibration transfer suppression mechanism includes an opening.

13. The vehicular lamp of claim 3, wherein the vibration transfer suppression mechanism includes an opening.

14. The vehicular lamp of claim 4, wherein the vibration transfer suppression mechanism includes an opening.

15. The vehicular lamp of claim 5, wherein the vibration transfer suppression mechanism includes an opening.

16. The vehicular lamp of claim 1, wherein the vibration transfer suppression mechanism includes a portion where thickness is different from surroundings.

17. The vehicular lamp of claim 2, wherein the vibration transfer suppression mechanism includes a portion where thickness is different from surroundings.

18. The vehicular lamp of claim 3, wherein the vibration transfer suppression mechanism includes a portion where thickness is different from surroundings.

19. The vehicular lamp of claim 4, wherein the vibration transfer suppression mechanism includes a portion where the thickness is different from surroundings.

20. The vehicular lamp of claim 5, wherein the vibration transfer suppression mechanism includes a portion where thickness is different from surroundings.

* * * * *